Oct. 27, 1964 R. V. KEYS 3,153,958
ROTARY WIRE STRIPPER
Filed Jan. 7, 1963
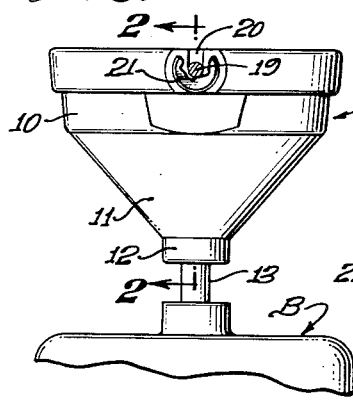
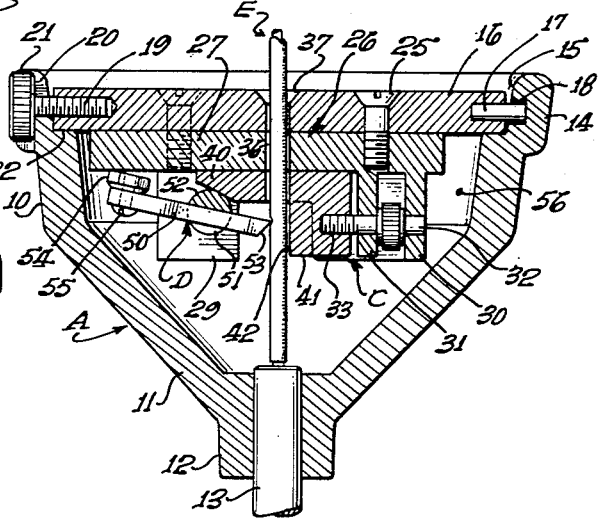
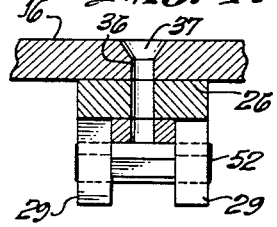
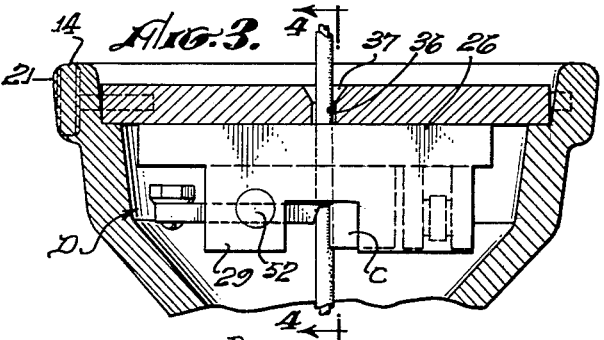
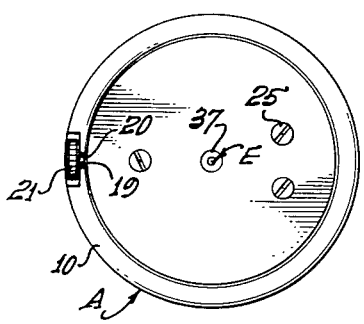
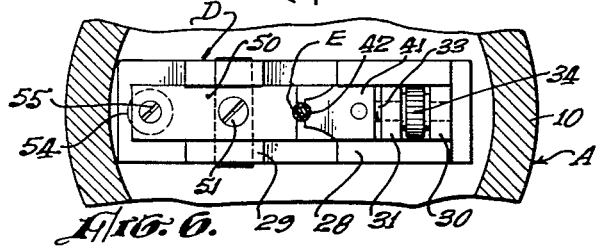
RICHARD V. KEYS,
INVENTOR.
BY *Lynn H Latta*
ATTORNEY.

United States Patent Office 3,153,958
Patented Oct. 27, 1964

3,153,958
ROTARY WIRE STRIPPER
Richard V. Keys, 10245 Parise Drive, Whittier, Calif., assignor of one-half to Harold J. Mock, Los Angeles, Calif.
Filed Jan. 7, 1963, Ser. No. 249,731
5 Claims. (Cl. 81—9.51)

This invention relates to the stripping of insulative covering from the ends of electrical conductors to bare the conductors for connection to electrical units.

Its general object is to provide an improved motor driven, rotary stripper of maximum rapidity of operation.

The invention is especially concerned with the stripping of thin-walled insulative coverings of tough, flexible materials such as nylon, Teflon, and the like which are commonly found to be difficult to strip.

The invention is also specially directed to the stripping of relatively soft or limp conductors such as stranded wire and cable. This type of conductor likewise is difficult to strip because of its low degree of self-sustaining stiffness.

A principal object of the invention is to provide a power-driven stripper that will rapidly strip an end portion of insulative covering from a wire or cable without scratching or otherwise marring its metallic surface. Another object is to provide for stripping a stranded cable without splaying the ends of the strands.

The invention provides a rotary stripper embodying an orbiting stripping blade which will exert a circumferential scoring action on the insulative covering of a conductor without touching the conductor.

A further object is to provide a stripper fully effective in stripping heavy enamel-coated asbestos wire covering.

Another object is to provide a rotary stripper having opposed blade and anvil jaws for exerting an orbiting pinching action on a wire covering, wherein the blade will recede to an open position in response to end pressure against the blade by a wire inserted into a receiving mouth of the stripper, in which open position the wire will enter a gap between the blade and anvil so as to be engaged between them for the stripping operation; and having means for yieldingly biasing said blade for exerting pinching pressure against the wire.

A further object is to provide such a stripper wherein the pinching pressure is developed in the blade by centrifugal force resulting from the orbiting movement of the blade.

A still further object is to provide a rotary stripper which is operative to simultaneously effect a helical twisting or wringing action against an end portion of stranded wire or cable while stripping off its insulative covering, whereby to leave the bared end of the cable in a tightly twisted, stiffened condition, for further handling.

Other objects and advantages will become apparent in the ensuing specification and appended drawing in which:

FIG. 1 is a side elevational view of a motor-driven rotary wire stripper embodying our invention;

FIG. 2 is an axial sectional view of the stripper head;

FIG. 3 is a fragmentary sectional view of the same, with the internal parts shown in elevation;

FIG. 4 is a cross-hectional view of the same, taken on line 4—4 of FIG. 3;

FIG. 5 is a front elevational view of the stripper head; and

FIG. 6 is a top elevation of the channel assembly.

Referring now to the drawings in detail, we have shown therein, as an example of one form in which our invention may be embodied, a rotary stripper embodying, in general, a head A adapted to be mounted on the shaft of a motor B for rotation; and an anvil C and stripper blade D mounted within the head for orbiting movements around the axis of rotation of head A and having respective jaw parts in diametrically opposed relation on respective sides of the axis and adapted to pinch between them an end of a wire E. Blade B is pivotally mounted for rocking movement to effect approaching and receding movements of the jaw end of blade D with reference to anvil C, whereby to close and open a wire-receiving gap that is defined between the two jaw elements.

Head A is of bell form, comprising a skirt portion 10 integrally joined by a frusto-conical hip portion 11 to a hub 12 for mounting the head on shaft 13 of motor B. Skirt 10 has a rim flange 14 defining a counterbore 15 in which is received an end plate 16 of circular disc form. At one side, end plate 16 has a tenon 17 secured in a radial peripheral bore therein and projecting from its periphery for releasable reception in an internal radial socket 18 in flange 14. At its diametrically opposite side, end plate 16 has a clamp screw 19 threaded radially therein, receivable in an open slot 20 in flange 14 and having a head 21 operable to establish clamping engagement with rim flange 14, with end plate 16 thus secured in counterbore 15, seated against a shoulder 22 defining the bottom of the counterbore. The lateral wall of the counterbore is slightly frusto-conical, flaring outwardly from shoulder 22 at an angle of or near 5° to the axis of rotation, and the periphery of end plate 16 establishes a snug, slightly wedging engagement with this lateral wall adjacent shoulder 22, to provide a piloting action which accurately centers the end plate in coaxial relation to the body of the head A.

Secured to the inner face of end plate 16 (e.g. by means of two or three or more screws 25) is a mounting bracket 26 of rectangular channel form comprising a flat bottom 27 secured against the plate 16 and laterally opposed parallel side wings 28 and 29 which may be formed as integral portions of side members of the channel section material as indicated.

Bracket 26 further includes a pair of longitudinally spaced transverse bearing arms 30 and 31 having respective bearing bores disposed on a median longitudinal axis and providing bearings for the shaft 32 of an anvil adjustment screw 33, at respective ends of a knurled knob 34 fixed on the screw 32.

Provided in the end plate 16, and extending through the bracket bottom 27 and through the anvil C, is a wire-receiving mouth 36 in the form of a cylindrical bore, having a belled entry port 37 in end plate 16. The mouth 36 is coaxial with the rotational axis of the head A, and in axially opposed relation to the end of shaft 13, which functions as a stop for positioning the wire E in the head for a stripping operation.

Anvil C comprises a flat base portion 40 seated flatly against the inner face of bracket bottom 27 and embraced snugly but free for sliding movement, between the bracket wings 28 and 29. The anvil C further includes an anvil head 41 into which the adjustment screw 33 is threaded, the head 41 being embraced and securely positioned between the bracket wings 28. Head 41 has a nose provided with a semi-cylindrical channel shaped saddle 42, normal to the plane of the flat bearing face of base 40 and parallel and adjacent to the rotational axis of the head B. Normally, it constitutes an aligned continuation of one side of the wire-receiving mouth 36.

At this point it may be noted that the mouth 36 has a diameter sufficiently large to accommodate the maximum gage of covered wire to be stripped. For effective stripping operations on varying diameters of wire, the screw 33 is adjusted to shift the saddle 42 toward and from the opposite side of the mouth 36 so as to vary the width of the gap provided between the saddle 42 and the adjacent end of stripping blade D (constituting the two jaws of the stripping apparatus).

Blade D comprises a blade body 50 of elongated rectangular form, having an intermediate portion secured, as by a screw 51, in a chordal slot in a pivot 52 the ends of which are journalled in the bracket wings 29 on an axis transverse to the rotational axis of head A and spaced radially therefrom, whereby an inner end portion of blade 50 projects toward the rotational axis in a generally radial direction and overhangs the mouth 36 for engagement with wire E. The blade has a bevelled inner end 53 constituting a wire-engaging jaw and providing an acute edge, subtending a dihedral angle of the order of 75° to the back face of blade D and extending at right angles to the mouth 36. The jaw 53 makes initial engagement with wire E when blade D is tilted at an acute angle to the rotational axis, as shown in FIG. 2. Through such initial engagement, the rotation of the head will cause the acute edge of the blade to score the insulation of wire E circumferentially.

On the outer end of blade body 50 is a centrifugal weight 54, secured thereto by suitable means such as screw 55.

In the operation of the stripper, the head A will be constantly rotated by motor B while a succession of wires are inserted into mouth 36. As a wire end makes engagement with the overhanging innert end of blade D while being pushed into the mouth 36, the end pressure will cause the inner end of blade D to recede away from the rotational axis (the blade rocking toward the tilted position shown in FIG. 2) until the gap between jaws 53 and 42 is wide enough for the wire to pass, whereupon the wire will advance into engagement with the end of motor shaft 13, functioning as a stop. During the short interval while the wire is thus stopped in a fixed position, the insulation will be circumferentially scored as hereinafter described. The operator then withdraws the wire from mouth 36, and the stripping and twisting operations described hereinafter, will be effected. Another wire is then inserted into the stripper head, and the operation is repeated.

In the stripping operation, orbiting movement of blade D around the rotational axis, derived from rotation of head A, will cause the blade D to seek a position normal to the rotational axis, under the centrifugal forces generated in blade body 50 and counterweight 54. This will yieldingly bias the jaw 53 of the blade toward the wire E, pinching the wire against the anvil saddle 42. At the same time, as the blade assumes a position nearly normal to the rotational axis, the bevelled face of jaw 53 will shift to a position of near-parallelism to the rotational axis, and the jaw 53 will exert a helically wringing action against wire E as the latter is withdrawn from mouth 36 while rotation of head A continues. This will have two desirable results, namely, (a) the end portion of the insulative covering, between the scored area and the end of the wire, will be cleanly twisted off (severed) from the body of the covering, and will be discharged into the receptacle chamber 56 provided within head A and (b) the uncovered end portion of the conductor wire or cable will be twisted with a helical ironing action of jaw 53 as the wire is withdrawn from the head.

In summary, it will be apparent that, with the stripper rotating, a wire or stranded conductor may be inserted, causing the blade to open; and that withdrawal automatically closes the blade, which thereby functions to strip the end of the wire or stranded conductor with a unique wringing action that leaves a stranded conductor tightly twisted for further handling. Speed of operation is limited only by the rate at which wires can be fed into and out of the stripper.

I claim:

1. In a device for stripping insulation from a covered conductor wire, in combination: an anvil having a mouth to receive a wire end and having an abutment jaw substantially aligned with said mouth to provide a support for said wire end; means supporting said anvil for rotation about the axis of said mouth; a scoring blade; a pivot supporting said blade in a position extending generally radially from said axis, for rocking movement on a tilt axis transverse to said mouth axis, from a tilted position subtending an acute angle to said mouth axis, toward a radial position normal to said mouth axis, said blade having an outer end portion extending generally radially outwardly from said pivot and having an inner end portion projecting toward said abutment jaw and terminating in a stripping edge positioned to engage said wire end against said abutment jaw upon tilting of said blade toward said radial position and to circumferentially score the insulative covering of said wire end upon rotation of said anvil about said mouth axis while exerting a twisting force on said wire end; and a weight carried by said outer end portion on the forward face thereof toward said anvil mouth and developing centrifugal force acting to tilt said blade toward said radial position, said blade being free of any tilting force other than centrifugal force.

2. A stripping device as defined in claim 1, wherein said head comprises a bell-shaped casing including a mounting hub, a frusto-conical hip portion extending therefrom, and a skirt extending from said hip portion and terminating in a rim flange having a counterbore; and an end plate of disc form having said mouth in its center, said end plate being received in said counterbore, having at one side a tenon projecting radially from its periphery and received in a socket in said rim flange, and a clamp screw threaded radially into its periphery diametrically opposite said tenon, said rim flange having an open slot receiving said clamp screw, whereby said screw can be tightened against said rim flange to secure said end plate in said counterbore.

3. A stripping device as defined in claim 1, wherein said stripping edge is defined between a bevelled end face of said blade inner end portion, parallel to said tilt axis, and said forward face of the blade, said bevelled end face subtending a dihedral angle of the order of 15° to said mouth axis when said blade assumes said radial position, whereby to grip said insulative covering against said abutment face with a wedging action.

4. In a device for stripping an insulative covering from a conductor wire, in combination: a head having means for mounting the same on a motor shaft for rotation and a wire-receiving mouth coaxial with the axis of rotation of said head, an anvil having an abutment jaw disposed as a continuation of a side wall surface of said mouth; a centrifugal force-responsive stripper blade mounted in said head for tilting movement on an axis transverse to said axis of rotation and radially spaced therefrom, between a position tilted at an acute angle to said rotational axis and a radial position normal to said axis, said blade having an inner end which, in said tilted position, is in proximity but in non-obstructing relation to said mouth, and, in said radial position, will wedge said wire against said abutment jaw and, upon rotation of said head, will circumferentially score said insulative covering so that, upon withdrawal of said wire, the end portion of said covering projecting beyond the scoring area, will be withdrawn from the wire while a twisting force is applied to the wire by the areas of said blade end and abutment face in clamping engagement with the wire; said anvil being elongated radially of said axis of rotation; said head including a bracket having parallel wings between which said anvil is retained for radial sliding adjustment and an axially extending arm opposed to the end of anvil remote from said blade; and an adjusting screw operative between said anvil and said arm for adjusting said anvil radially to adjust the gap between said jaw and said inner end of the blade.

5. A wire stripping device as defined in claim 4, wherein said anvil extends across said axis of rotation and has a bore substantially aligned with said mouth and defining said abutment jaw at one side thereof.

References Cited in the file of this patent

UNITED STATES PATENTS

| | | |
|---|---|---|
| 1,306,588 | France | June 10, 1919 |
| 1,477,678 | Wetmore | Dec. 18, 1923 |
| 1,661,180 | Johnson | Mar. 6, 1928 |
| 2,346,314 | Lembitz et al. | Apr. 11, 1944 |
| 3,074,301 | Carpenter | Jan. 22, 1963 |

FOREIGN PATENTS

| | | |
|---|---|---|
| 123,507 | Australia | Feb. 5, 1947 |
| 554,637 | Great Britain | July 13, 1943 |